UNITED STATES PATENT OFFICE.

MARTIN WANNER, OF ROBINSON, ASSIGNOR OF THREE-FOURTHS TO ALBERT H. WEBER, OF DENVER, COLORADO.

LIQUID COMPOSITION FOR USE IN SYSTEMS OF HEATING.

SPECIFICATION forming part of Letters Patent No. 417,213, dated December 10, 1889.

Application filed January 7, 1889. Serial No. 295,703. (No specimens.)

*To all whom it may concern:*

Be it known that I, MARTIN WANNER, a citizen of the United States of America, residing at Robinson, in the county of Summit and State of Colorado, have invented a certain new and useful Liquid Composition for Use in Systems of Heating, of which the following is a specification.

My invention relates to a new liquid composition for use as the circulating medium for the absorption, transportation, and diffusion of heat in pipe systems of heating analogous to what are termed "steam" and "hot-water" systems. In such systems water, either as a liquid or as steam or vapor, has generally been used and recognized as the best available circulating medium; but the only characteristic advantage it possesses for such use is its high specific heat. On the other hand, it possesses several characteristic disadvantages counterbalancing, in part at least, such advantage. First, its comparatively low boiling-point causes it to have at relatively-low temperatures comparatively great internal pressure or strain, which is transferred to the containing mechanical devices, exerting force oftentimes great and dangerous, sometimes destructive, upon the heater and pipes of the system, necessitating for the decrease of such dangers extra weight and strength of material in boiler and pipes and great care at joints to avoid leakage, while its tendency to condense, when used as steam, involves in addition not only the employment of steam-traps, &c., but also an impairment of heating capacity in pipes and radiators by the presence therein of water of condensation. Second, its crystallizability under even moderately-low temperatures renders its use dangerous in exposed pipes and situations, as the freezing or solidifying of the medium therein under such conditions may work destruction to the whole system. It seems, therefore, that a more perfect and fit medium for circulation in such systems should be used. By investigating I have found—and such will be generally recognized as the fact—that such a medium, a comparatively perfect if not totally perfect one, should possess certain characteristics, which are, first, high specific heat, that it may be able to absorb and retain for the time being a large amount of caloric to be given off or diffused under proper conditions; second, a high boiling-point, that it may not be easily vaporized and be free from any great internal pressure, thus relieving the heating and circulating system of disruptive forces and the danger therefrom, permitting, as a consequence, the use of simplified and lighter mechanical devices; third, lack of crystallizability even under quite low temperatures, that danger of clogging the pipes by frozen or crystallized masses be avoided.

In view of these things the object of my invention is to produce a liquid compound having the characteristics noted for the circulating medium in fluid-circulating systems of heating; to which end it consists, first, in a fluid composition having a high specific heat, a high boiling-point, and which is non-crystallizable or solidifiable under ordinary low temperatures down to, say, 20° Fahrenheit, and, second, in a fluid composed of a mixture of any of the higher alcohols, as a mono, di, tri, or tetra hydric alcohol and an ester or acetine thereof, all as more fully hereinafter set forth and claimed.

In practicing the invention to form the compound which is the subject thereof, any one of the higher alcohols, such as the dihydric (glycol) or the trihydric (ordinary glycerine,) or any of the polyglycerines, is taken and mixed with an equal amount of the ester or acetine of the same alcohol, the two being mixed cold. They are then heated to about 250° centigrade, or to near the boiling-point of the mixture, such boiling-point being about 260° to 270° centigrade, (500° to 518° Fahrenheit,) and afterward cooled, and preferably to below zero, the result being a perfectly stable compound possessing the required characteristics.

For a clearer understanding, the formation of the compound will now be traced step by step, taking one of the higher—say trihydric alcohol—as the base thereof. First, to prepare the ester, a quantity of the trihydric is placed in an open vessel or boiler and heated to about 225° centigrade, and while heated the vapors of acetic acid are passed therethrough until ebullition (a sign indicative of continued reaction) ceases. The product is then raised to its boiling-point (about 240° centigrade) and the boiling continued for a short time to eliminate and drive off any traces of free acetic acid. It is essential that no trace of free acid be left; hence if this mere boiling does not drive off all free acetic acid the compound should be boiled in the presence of lead oxide, the affinity of the lead for the acetic acid insuring the complete removal of any free acid. The result of this treatment is that all the glycerine has been converted into a diacetine of glycerine, which is then cooled, and preferably to below zero. After cooling it is permitted to stand from twelve to twenty-four hours, after which equal parts of such ester or diacetine and of trihydric alcohol are mixed and the compound heated to near its boiling-point—say to 250° centigrade—and then cooled. There has thus been formed a composition consisting of trihydric alcohol and an ester thereof.

Though ordinarily the use of equal parts of alcohol and its ester in forming the compound is deemed preferable, I do not wish to limit myself to these proportions, for the reason that upon the respective proportions of the higher alcohol and the acetine or ester thereof depend the boiling-point, specific heat, and the degree of non-solidification of the resulting compound. For example, the compound resulting from heating to 200° centigrade of one molecule of a trihydric alcohol and one molecule of acetine of the same, a compound results whose boiling-point is 272° centigrade, its specific gravity 1.3, water being the standard, and its point of congealing —56° centigrade. To vary from these proportions in either direction affects the characteristics of the resulting compound. These characteristics will approach more nearly those of the ingredient predominating in the compound. For instance, a greater proportion of the acetine will reduce the boiling-point, lower the point of congealing, but increase its specific gravity and capacity for heat. On the other hand, a greater proportion of the alcohol raises the boiling-point, raises the point of congealing and decreases the specific gravity and heat capacity or specific heat. It may therefore be necessary to vary the proportions according to the climatic conditions of the locality where the compound is used. The liquid for use in northern parts of this country, for instance, may have to be so constituted that the point of congealing is lowered even at the expense of reducing the boiling-point, whereas the reverse of this may be necessary farther south. Such a compound may be repeatedly heated under atmospheric pressure to its boiling-point and alternately cooled below zero; but such tests will leave it unaffected—neither lowering its boiling-point on the one hand, nor causing it to solidify on the other hand— such tests proving it to be an exceedingly permanent stable compound. It has a high specific heat-rating, standing at about .97 to the 1 of water, thus having large capacity for the storage of heat from a prime source thereof. Its boiling-point under atmospheric pressure is over 260° centigrade, (500° Fahrenheit,) so that it may safely be heated to 230° centigrade, (446° Fahrenheit,) at which point it is equivalent to steam or water under three hundred pounds pressure; but at that temperature the compound is still 30° centigrade below its boiling-point; consequently it exerts no disruptive strain or pressure on the boiler or the pipes or radiators; hence such devices may be of lighter construction, while, as it may be heated safely to so high a degree, the plant, pipes, radiators, &c., may be much reduced in size to attain equal efficiency, as at such heat, or below its boiling-point, no condensation can occur, clogging pipes, impairing the heating capacity of radiators, and necessitating the use of steam-traps. It can deposit no sediment or scales and does not injuriously affect the metal; hence it may remain in the pipes of the system when not in use without impairment thereof or of itself, and as it does not readily, if at all, solidify, it may be safely used in exposed pipes.

As a smooth easy-flowing compound, it can circulate with little friction in the pipes, contacting closely with the surfaces of the prime source of heat and of the radiators and pipes. It also has a maximum efficiency in first the absorption and then the diffusion of caloric.

Having thus described my invention, what I claim is—

1. A liquid composition for use in systems of heating, said composition being composed of any of the higher alcohols and the acetine of the same in proportions giving the compound a high specific heat, a high boiling-point, and rendering it non-solidifiable under ordinary low temperatures, substantially as set forth.

2. A liquid composition for the absorption, transportation, and diffusion of heat in fluid-circulating heating systems, consisting of a higher alcohol and an ester or acetine thereof, combined substantially in the proportions specified.

3. A liquid composition for use in fluid-circulating heating systems, consisting of a higher alcohol and an ester or acetine thereof, combined in the proportions specified.

In testimony whereof I affix my signature in presence of two witnesses.

MARTIN WANNER.

Witnesses:
 Z. F. WILBER,
 FRANK THOMPSON.